United States Patent [19]

Takayama et al.

[11] 4,289,959
[45] Sep. 15, 1981

[54] APPARATUS FOR DETECTING THE IN-FOCUSING CONDITIONS

[75] Inventors: Shuichi Takayama; Kosaku Tsuboshima; Yoshio Nakajima, all of Hachioji; Teruo Iwasawa, Mitaka; Masafumi Yamazaki, Okaya, all of Japan

[73] Assignee: Olympus Optical Company Limited, Tokyo, Japan

[21] Appl. No.: 92,686

[22] Filed: Nov. 9, 1979

[30] Foreign Application Priority Data

Nov. 15, 1978 [JP] Japan ................................ 53-141288

[51] Int. Cl.³ .............................................. G02B 5/14
[52] U.S. Cl. ..................................... 250/201; 250/227
[58] Field of Search .................... 250/206, 204, 227; 354/25; 356/4

[56] References Cited

U.S. PATENT DOCUMENTS 4,060,725  11/1977  Hoshika ........................ 250/201 X Primary Examiner—David C. Nelms
Assistant Examiner—Darwin R. Hostetter
Attorney, Agent, or Firm—Haseltine & Lake

[57] ABSTRACT

An apparatus for detecting the in-focusing conditions is disclosed. The apparatus comprises a light guide member having light incident end arranged along a plane which is placed at an angle of inclination against a predetermined focal plane of an optical system; a light receiver arranged near a light outlet end of the light guide member and consisting of a plurality of charge transfer elements arranged to receive light from the outlet end as a picture element array; means for deriving illuminance signals from the picture element array of the light receiver; and means for treating the illuminance signals to detect the in-focused position of the optical system.

7 Claims, 13 Drawing Figures

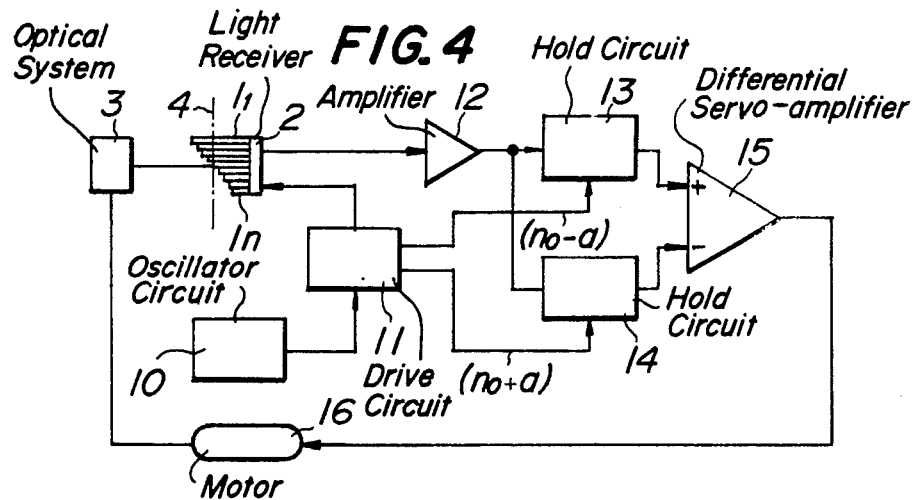
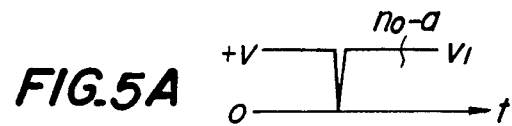
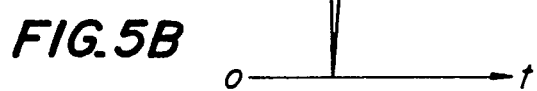
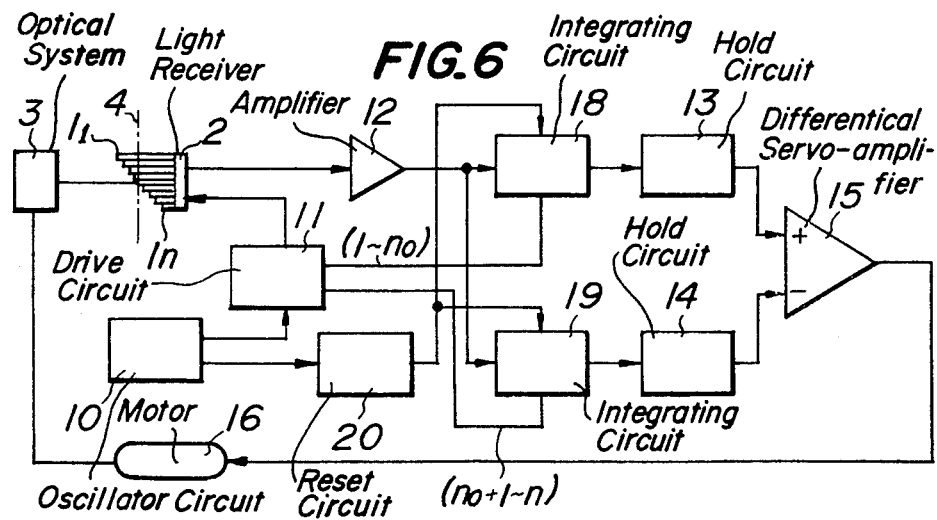

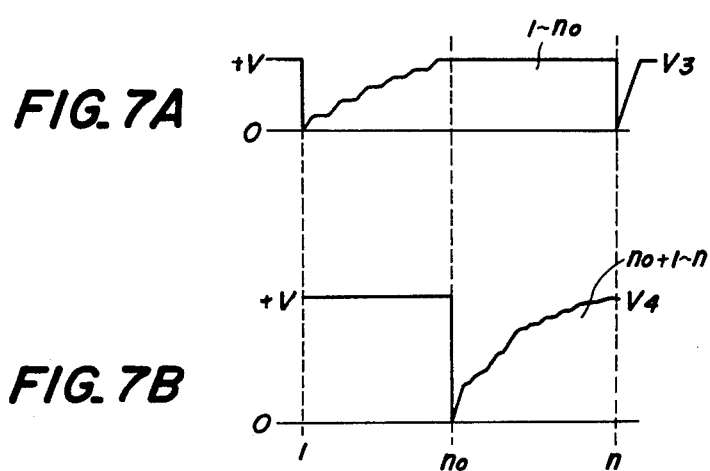
FIG. 7A
FIG. 7B
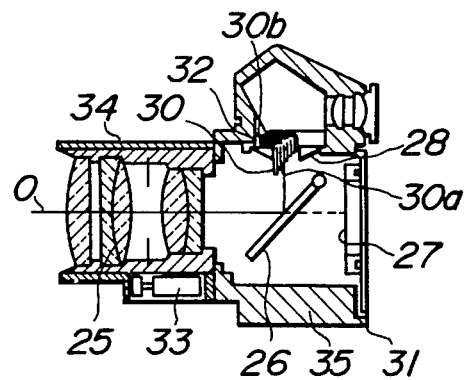
FIG. 8

APPARATUS FOR DETECTING THE IN-FOCUSING CONDITIONS

BACKGROUND OF THE INVENTION

The present invention relates to an apparatus for detecting the in-focusing conditions used for an optical machinery such as cameras, microscopes, endoscopes and the like.

As one of the conventional apparatus for detecting the in-focusing conditions, photo-electro transducer elements such as CdS cell or the like are arranged in front and in the rear of a predetermined focal plane of an optical system, illuminance signals from these two elements are compared with each other and an in-focusing position is detected. In this apparatus, however, when the optical system is at the in-focusing position, it is necessary to make levels of these illuminance signals of two photo-electro transducer elements equal, so that it is difficult to arrange these two elements in correct position, and a precision is worse since the illuminance signals are compared at a fixed position. In case of changing a depth of a focus by modifying or exchanging an optical system, if the setting positions of two photo-electro transducer elements in front and in the rear of a predetermined focal plane are not changed accordingly, it is impossible to detect a precise in-focusing position.

There is another apparatus for detecting the in-focusing conditions which is so constructed that photo-electro transducer elements such as CdS cell or the like are arranged in front and in the rear of a predetermined focal plane in the same manner as described above, images focused on these two elements are scanned by a rotary mirror, contrasts of images on these elements are sought and compared with each other, thereby to detect an in-focusing position. Even in this apparatus, however, when the optical system is at the in-focusing position, it is necessary to arrange two elements so as to make respective contrasts of images on two photo-electro transducer elements equal to each other, so that it is also difficult to arrange these elements in correct position. This disadvantage also arises in case of changing depth of focus of the optical system. Moreover, in order to seek the contrasts, it is necessary to obtain an illuminance signal of a picture element array by scanning an image formed on a plane orthogonal to an optical axis at an arranged position to respective photo-electro transducer elements on the light receiving surfaces of respective elements, so that a rotary mirror for scanning and its driving device are required, and thus, an apparatus itself becomes disadvantageously large as a whole.

A further apparatus is also proposed which is so constructed that a light receiver consisting of image sensors such as CCD (charge coupled device) or the like is provided on a predetermined focal plane of an optical system, the magnitudes of contrasts for the images focused on the light receiver are compared with each other in succession thereby to detect the in-focusing conditions. In this apparatus, however, in successive comparison of the magnitudes of the contrasts, the in-focusing position is detected by the change of a polarity of the result obtained by the comparison, so that the detected position of the in-focusing does not meet with the actual in-focusing position of the optical system and thus the precision of the in-focusing detection becomes worse. In case of automatically moving and adjusting the optical system to an in-focusing position based on the result of comparison, even if the direction of the deviation of the in-focusing position is found by a polarity of the result of comparison, an amount of the deviation cannot be found, so that its control becomes complicated and troublesome, and its response becomes also a problem.

SUMMARY OF THE INVENTION

An object of the present invention is to eliminate the above mentioned disadvantages of the conventional in-focusing condition detecting apparatus.

Another object of the present invention is to provide an in-focusing condition detecting apparatus capable of detecting the in-focusing conditions with a high precision and having a small and simple construction.

According to the present invention an apparatus for detecting the in-focusing conditions comprises a light guide member having light incident end arranged along a plane which is placed at an angle of inclination against a predetermined focal plane of an optical system; a light receiver arranged near a light outlet end of the light guide member and consisting of a plurality of charge transfer elements arranged to receive light from the outlet end as a picture element array; means for deriving illuminance signals from the picture element array of the light receiver; and means for treating the illuminance signals to detect the in-focused position of the optical system. The optical fibers of the light guide member have different length, respectively, these optical fibers are aligned in line to form a one-dimensional array, the outlet ends of the respective optical fibers are aligned on same plane and the inlet ends of the respective optical fibers are placed at different levels, respectively in such a manner that the inlet end of the center optical fiber of the optical fiber array is placed on the predetermined focal plane.

The optical fibers of the light guide member have different length, respectively, these optical fibers are arranged as a two-dimensional array, the outlet ends of the respective optical fibers are aligned on same plane so as to correspond to all picture elements of the light receiver of a two-dimensional charge transfer element array and the inlet ends of the respective optical fibers are placed at different levels to form a circular cone in such a manner that the inlet end of the center optical fiber corresponding to the center picture element is made a vertex of the cone. The predetermined focal plane of the optical system may be set at an optional position where the cross section of the conical fiber bundle becomes a true circle between the apex inlet end of the optical fibers and the lowermost inlet end of the optical fibers.

The optical fibers of the light guide member have different length, respectively, these optical fibers are radially arranged as a two-dimensional array, the outlet ends of the respective optical fibers are aligned on same plane so as to correspond to selected picture elements of the light receiver of a two-dimensional charge transfer element array, and the inlet ends of the respective optical fibers are placed at different elevels so as to form a pyramid around the apex inlet end of the center optical fiber. The predetermined focal plane of the optical system may be set at an optional position where the cross section of the fiber pyramid becomes a polygon between the apex inlet end of the optical fibers and the lowermost inlet end of the optical fibers.

The optical fibers of the light guide member have different length, respectively, these optical fibers are radially arranged as a two-dimensional array, the outlet ends of the respective optical fibers are aligned on same plane so as to correspond to selected picture elements of the light receiver of a two-dimensional charge transfer element array, and the inlet ends of the respective optical fibers are placed at different levels in such a manner that the center inlet end of the center optical fiber corresponding to the center picture element in the diagonal line and the center row and column of the picture elements of the light receiver is used in common and positions or levels of the inlet ends of optical fibers in the diagonal line and the center row and column are continuously changed from one end to the other end. The predetermined focal plane of the optical system may be set at a plane passing through the center inlet end of the center optical fiber and parallel to the plane of the picture elements.

BRIEF DESCRIPTION OF THE DRAWING

FIG. 4 is a block diagram showing one embodiment of a signal treating circuit of the apparatus for detecting the in-focusing conditions according to the invention;

FIGS. 5A and 5B are schematic views showing one embodiment of a hold signal in the hold circuit shown in FIG. 4;

FIG. 6 is a block diagram showing another embodiment of the signal treating circuit of the apparatus for detecting the in-focusing conditions according to the invention;

FIGS. 7A and 7B are schematic views showing one embodiment of a hold signal in the hold circuit shown in FIG. 6;

FIG. 8 is a cross-sectional view showing one embodiment of a single-lens reflex camera provided with the apparatus for detecting the in-focusing conditions according to the invention.

DETAILED DESCRIPTION OF THE INVENTION

Figure 1:
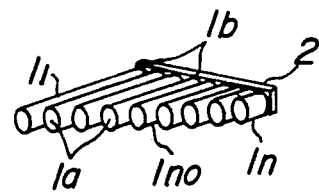
FIG. 1 is a perspective view showing one embodiment of a light guide member and a light receiver used for an apparatus for detecting the in-focusing conditions according to the invention.
Figure 2:
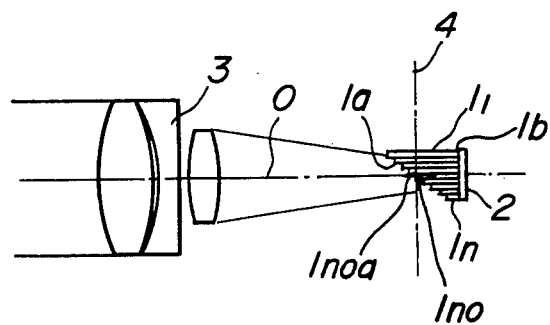
FIG. 2 is a schematic view showing one embodiment of the apparatus for detecting the in-focusing conditions according to the invention.

Referring now to FIGS. 1 and 2 one embodiment of an apparatus for detecting the in-focusing conditions according to the present invention will be explained.

FIG. 1 is a perspective view showing one embodiment of a light guide member and a light receiver used for an apparatus for detecting the in-focusing condition according to the invention. In the present embodiment, as a light guide member, use is made of a plurality of optical fibers $1_1$-$1_n$ aligned in one array. These optical fibers have different lengths with each other and are continuously arranged on light receiving surface of a light receiver 2 of one-dimensional array consisting of charge transfer elements such as CCD, BBD (bucket brigade device) or the like arranged as a picture element array. An inlet end $1a$ and an outlet end $1b$ of each optical fiber 1 are optically polished, respectively. FIG. 2 shows one embodiment of an apparatus for detecting the in-focusing conditions according to the invention with the use of such optical fiber array and the light receiver 2.

In FIG. 2, an inlet end $1_{n0a}$ of an optical fiber $1_{n0}$ almost at the center of an optical fiber array aligned in row is arranged at the position passing through an optical axis O of an optical system 3 on a predetermined focal plane 4 of the optical system 3 which has to detect the in-focusing conditions. In this manner, respective inlet ends of the optical fiber array contain the predetermined focal plane 4, are arranged along a plane inclined to the focal plane 4, and receive an image formed in front and in the rear of the focal plane. In general, an image formed on the focal plane of the optical system has strong contrast as compared with that formed in front and in the rear of the focal plane.

Therefore, in FIG. 2, if illuminance signals corresponding to an image formed on the predetermined focal plane 4 and/or images formed in front and in the rear thereof are selectively derived from the light receiver 2 and compared with each other, it becomes possible to detect the direction and amount of a deviation of the focal position of the optical system 3 from the predetermined focal plane 4.

Figure 3:
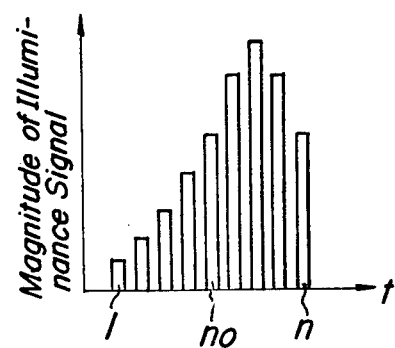
FIG. 3 is a schematic view showing one embodiment of illuminance signals obtained from the light receiver shown in FIG. 2.

FIG. 3 is a schematic view showing one embodiment of illuminance signals derived from each picture element of the light receiver 2 as a time series in the construction shown in FIG. 2, in which an abscissa shows a time t and an ordinate shows a magnitude of the illuminance signal. The number of light guide members for constructing the light receiver 2, i.e., the number of the optical fibers 1, is n, and the inlet end $1a$ of the $n_0$th optical fiber 1 positioned to at almost the center of the optical fibers receives an image formed on the optical axis O at the predetermined focal plane 4. In this case, the illuminance signal of the image formed in the rear of the predetermined focal plane 4 is larger than that of the image formed in front thereof, so that the optical system 3 is under the rear focussed condition.

FIG. 4 is a schematic view showing one embodiment of a signal treating circuit of an apparatus for detecting the in-focusing conditions according to the invention. The construction and action thereof will be explained with reference to FIGS. 1-3. In FIG. 4, illuminance signals of two predetermined picture elements {$n_0$−ath and $n_0$+ath (a=1, 2, ..., $n_0$−1)} on both sides of the predetermined focal plane 4 among illuminance signals of each element from the light receiver 2 are selectively derived, and the optical system 3 is automatically moved and adjusted to the in-focusing position based on a comparison of these illuminance signals with each other. An oscillation circuit 10 supplies a predetermined clock pulse to a drive circuit 11. The light receiver 2 is driven by a clock pulse from the drive circuit 11 so as to successively supply illuminance signals of each picture element to an amplifier 12. The amplifier 12 amplifies illuminance signals from the light receiver 2 and supplies the amplified outputs to hold circuits 13 and 14, respectively. The hold circuits 13 and 14 are controlled by drive pulses corresponding to two picture element ($n_0$−a, $n_0$+a) selected from the drive circuit 11, respectively, so as to hold the output of the amplifier 12 at the time of receiving drive pulse. In this case, if the optical system 3 is under the rear focused condition as shown in FIG. 3, for the illuminance signals held by the hold circuits 3 and 4, a voltage $V_2$ of the picture element $(n_0+a)$ in the hold circuit 14 becomes larger than a voltage $V_1$ of the picture element $(n_0-a)$ in the hold circuit 13 as shown in FIGS. 5A and 5B, respectively. In FIG. 4, a differential servo-amplifier 15 compares signals held by the hold circuits 13 and 14, drives a motor 16 in accordance with difference of the signals, moves the optical system 3 in the direction of the optical axis, for example the direction far from the predetermined focal plane 4, and servo-controls to meet the focus of the optical system 3 with the predetermined focal plane 4 for a predetermined object to be taken. In order to place the optical system 3 at the in-focused position by comparing illuminance signals of the picture elements $(n_0-a)$ and $(n_0+a)$ on both sides of the predetermined focal plane at an equal distance from the picture element $(n_0)$ passed through the optical axis, it is preferable to move and adjust the optical system 3 to the position where the output of the differential servo-amplifier 15 becomes zero.

In an embodiment shown in FIG. 4, the illuminance signal of any optional picture element can be derived from the light receiver 2, so that if a picture element a is changed in accordance with a change of the depth of focus due to a change of the optical system 3, the in-focusing position can be detected with a predetermined sensitivity (precision).

FIG. 6 is a schematic view showng another embodiment of the signal treating circuit of the apparatus for detecting the in-focusing conditions according to the invention. In the present embodiment, the signal treating circuit is constructed in such a manner that in the circuit shown in FIG. 4 illuminance signals of each picture element from the light receiver 2 are integrated within the range of picture elements $(1 \sim n_0)$ and $(n_0+1 \sim n)$, respectively, and the optical system 3 is automatically moved and adjusted to the in-focusing position based on the comparison of these integrated values. Like numerals shown in FIG. 4 show like actions. In the present embodiment, therefore, the outputs of the amplifier 12 are supplied to integrating circuits 18 and 19, respectively, and the illuminance signals of the picture elements $(1 \sim n_0)$ and the illuminance signals of the picture elements $(n_0+1 \sim n)$ are integrated under control of the drive pulses corresponding to the picture elements $(1 \sim n_0)$ from the drive circuit 11 and the drive pulses corresponding to the picture elements $(n_0+1 \sim n)$ from the drive circuit 11, respectively, in these integrating circuits 18 and 19, and these integrated values are held in the hold circuits 13 and 14, respectively. In this case, if the optical system 3 is under the rear focused condition as shown in FIG. 3, the integrated values held in the hold circuits 13 and 14, as shown in FIGS. 7A and 7B, the integrated value $V_4$ of the picture elements $(n_0+1 \sim n)$ becomes larger than the integrated value $V_3$ of the picture elements $(1 \sim n_0)$. If the control is made in the same manner as in FIG. 4 based on the comparison of these integrated values, the optical system 3 can automatically be moved and adjusted to the in-focusing position. In the present embodiment, the integrated values are successively compared with each other in the course of movement of the optical system 3, so that the integrating circuits 18 and 19 are reset by a reset circuit 20 at every scanning of the light receiver 2.

According to the above embodiment, the illuminance signals in front and in the rear of the predetermined focal plane 4 are integrated, so that it becomes possible to detect and in-focusing position with high precision, and even if the depth of focus is changed by changing the optical system 3, it also becomes possible to detect the in-focusing position with high precision without changing arrangement of the optical fibers $1_1$–$1_n$ and the light receiver 2.

FIG. 8 is a cross-sectional view showing one embodiment of a single-lens reflex camera comprising an apparatus for detecting the in-focusing conditions according to the invention. In the present embodiment, inlet ends $30a$ of an optical fiber array 30 inclusive of a focal plane of a reticle 28 and aligned in an array along the plane inclined to the focal plane as shown in FIG. 2 are arranged at the position where a pencil of rays converged by a camera lens optical system 25 is reflected by a quick return mirror 26 provided at an angle of 45° to the optical axis O and imaged, and on the reticle 28 provided at the position conjugated to a film surface 27. Outlet ends $30b$ of the array 30 are faced to a light receiver 32 such as CCD or the like fixed to the front head portion of a camera body 31, and illuminace signals obtained from the light receiver 32 are treated by the signal treating circuit shown in FIG. 4 or 6. A motor 33 is driven by the thus treated signal so as to move the camera lens optical system 25 in the direction of the optical axis O within a lens barrel 34, so that the optical system 25 is automatically moved and adjusted to the in-focusing position. The signal treating circuit shown in FIG. 4 or 6 can be provided at a base portion 35 of the camera body 31.

In case of using the apparatus for detecting the in-focusing conditions according to the present invention for a single-lens reflex camera as described above, the light receiver 32 can be provided at any optional position outside the pencil of rays from the camera lens optical system 25, so that the camera body 31 can be assembled without making it large and there is no problem to observe through a finder. If the center portion of the quick return mirror 26 is made light transmissible and the pencil of rays transmitted through that portion is guided to the base portion of the camera body 31, the optical fiber array can be arranged at the position equivalent to the film surface 27 in this light path in the same manner as described above.

As apparent from the above, according to the invention, the inlet ends of the optical fibers of the light guide member are arranged along a plane inclined to the predetermined focal plane and inclusive of the focal plane of the optical system and the outlet ends of the light guide member is faced to the light receiver consisting of charge transfer elements of the picture element array such as CCD, BBD or the like, so that its arrangement is easy, the setting position of the light receiver can optionally be selected, and the apparatus can be small and simple in construction. Since the illuminance signals of the picture element array can be obtained at any optional position on or in front and in the rear of the predetermined focal plane, the in-focusing position can be detected with high precision by properly treating the illuminance signals.

Figure 9A:
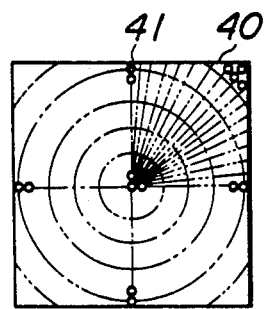
FIGS. 9, 10 and 11 are schematic views showing another arrangements of the light guide member and the light receiver used for the apparatus for detecting the in-focusing conditions according to the invention, respectively.
Figure 9B:
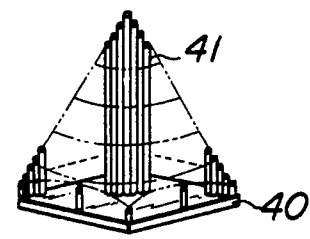
Figure 10A:
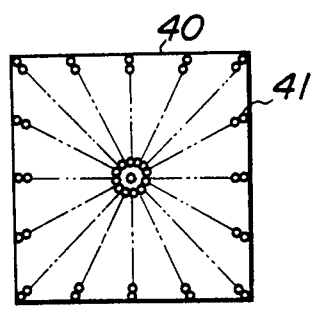
Figure 10B:
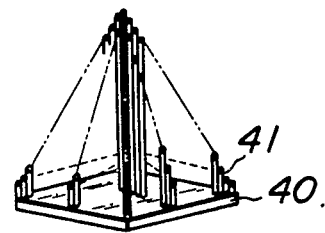
Figure 11:
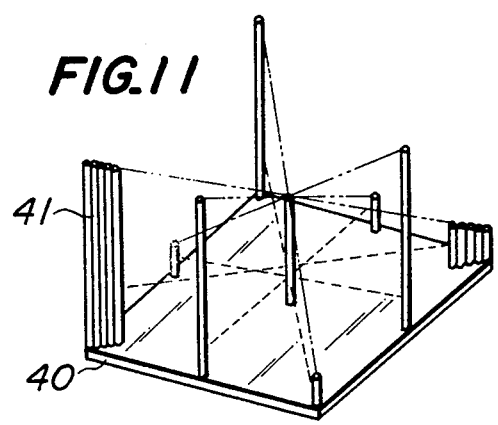

The present invention is not limited to the above embodiment, but can be modified or changed in various ways. For example, in FIG. 4, as the optical system 3 is closed to the in-focusing position, the illuminance level near the predetermined focal plane 4 becomes large, so that if the in-focus is detected by successively or selectively comparing respective illuminance signals derived from the picture elements on both sides of the focal plane at the position apart from the predetermined focal plane to the picture elements on both sides of the focal plane near the predetermined focal plane, it means that a signal having the large illuminance level can be treated as close to the in-focus, and thus, the in-focused position can be detected with higher precision. This detection can easily be attained by properly changing the timing of the drive pulse from the drive circuit 11. Further, by not only comparing the illuminance signals from the picture elements positioned at both sides of the predetermined focal plane 4, but also comparing the illuminance signal from the picture element ($N_0$) on the predetermined focal plane with the illuminance signals from the picture elements positioned on both sides thereof, the in-focusing position of the optical system 3 can be detected. On the other hand, by comparing the illuminance signal from the picture element ($n_0$) on the predetermined focal plane with the illuminance signal from any optional picture element on one side of the focal plane, the in-focusing position can be detected. If a plurality of inlet ends of the optical fibers arranged along a plane inclined to the predetermined focal plane 4 are arranged along the surface parallel to the predetermined focal plane, and light received by these inlet ends is guided to the light receiver such as CCD, BBD or the like of a two-dimensional array, it becomes possible to detect the contrast and size of an image formed on the predetermined focal and/or the surface parallel to the predetermined focal plane in front or in the rear thereof, and the in-focusing position can be detected by these comparisons. In this case, an image formed on the predetermined focal plane and/or in front and in the rear of the predetermined focal plane can be scanned without using a rotating mirror, so that the apparatus itself does not particularly become large. Further, the inlet ends of the light guide member can be arranged as shown in FIGS. 9, 10 and 11. That is, in FIG. 9, optical fibers 41 are arranged by corresponding to all picture elements of a light receiver 40 of a two-dimensional charge transfer element array, and the inlet ends of these fibers are arranged in the form of a cone by making the inlet ends of the fiber corresponding to the central picture element vertex. In this case, the predetermined focal plane of the optical system can be set at an optional position where the cross section of the conical fiber bundle becomes a true circle between the apex inlet end of the optical fibers and the lowermost inlet end of the optical fibers. In addition, FIG. 9A shows a schematic plan view and FIG. 9B shows a schematic partially perspective view by dividing the shape shown in FIG. 9A into four equal parts. FIG. 10, as well as FIG. 9, shows a partially radial arrangement of the inlet ends of a plurality of optical fibers around the apex inlet end of the central optical fiber, in which FIG. 10A is a schematic plan view and FIG. 10B is a schematic partially perspective view by dividing the shape shown FIG. 10A into four equal parts. Further, FIG. 11 shows the inlet ends of respective fibers with the use of the central inlet end of the optical fiber corresponding to the diagonal line and the center row and column of the picture elements of the light receiver 40 of the two-dimensional array in common by continuously changing the position of the inlet ends of the optical fibers. In this case, the inlet end position of the central fiber is preferably in the middle of the inlet ends of the fibers in each diagonal line and row and column, and the plane inclusive of this position is used as a predetermined focal plane of the optical system. When use is made of the light guide member arranged as shown in FIGS. 9, 10 and 11, the in-focus can be detected for the image formed at any optional portion on the predetermined focal plane and the effective in-focus can be detected for the image in the optional direction.

In the above-described embodiment and modification, the optical fiber is used as a light guide member, but a light guide film, a light guide array of condensed light type or the like can be used as the light guide member. Further, in the above embodiment, the optical system is automatically moved and adjusted to the in-focusing position based on the output of the differential servo-amplifier, but with the use of a comparator instead of the differential servo-amplifier, in the course of manually moving the optical system, if the in-focusing position is obtained, a light emitting diode or the like is lighted by the output of the comparator, or a sound is generated by driving a buzzer or the like, so as to display the in-focusing position. In the above embodiment, the inlet ends of the light guide members are arranged to receiver light on the optical axis of the optical system at the predetermined focal plane, but it is not necessary to arrange the inlet ends at this position, and the inlet ends of the light guide members include the predetermined focal plane even it does not pass through the optical axis, so that the inlet ends of the light guide members may be arranged along the plane inclined to the focal plane.

What is claimed is:

1. An apparatus for detecting in-focusing conditions of an optical system comprising: a plurality of optical fibers of different lengths which are closely arranged to each other and have light inlet ends arranged side by side along a given line and located at different levels when viewed in a direction of an optical axis of the optical system and light outlet ends located on a same plane, the inlet end of a centrally arranged optical fiber being situated on a predetermined focal plane of the optical system; a like number of charge transfer elements arranged at the respective outlet ends of the optical fibers to receive light rays emerging from respective picture elements and transmitted through the respective optical fibers and to produce illuminance signals; and means for receiving the illuminance signals from the charge transfer elements and processing the received illuminance signals in accordance with a predetermined function to produce a signal which represents a focusing condition of the optical system.

2. An apparatus for detecting the in-focusing conditions as claimed in claim 1, wherein the optical fibers are radially arranged as a two-dimensional array in such a manner that the inlet ends of the optical fibers form a circular cone and the outlet ends of the optical fibers form a circle and the charge transfer elements are arranged as a two-dimensional array corresponding to the circle.

3. An apparatus for detecting the in-focusing conditions as claimed in claim 1, wherein the optical fibers are radially arranged as a two-dimensional array in such a manner that the inlet ends of the optical fibers form a pyramid and the outlet ends form a rectangle, and the charge transfer elements are arranged as a two-dimensional array corresponding to said rectangle.

4. An apparatus for detecting the in-focusing conditions as claimed in claim 2, wherein the predetermined focal plane of the optical system may be set at an optional position where the cross section of the conical fiber bundle becomes a true circle between the apex inlet end of the optical fibers and the lowermost inlet end of the optical fibers.

5. An apparatus for detecting the in-focusing conditions as claimed in claim 1, wherein the optical fibers are radially arranged as a two-dimensional array in such a manner that the inlet end of a center optical fiber is commonly used as the inlet end for at least one diagonal line and center row and column and the levels of the inlet ends of the optical fibers are continuously changed from one end to the other.

6. An apparatus for detecting the in-focusing conditions as claimed in claim 3, wherein the predetermined focal plane of the optical system may be set at an optional position where the cross section of the fiber pyramid becomes a polygon between the apex inlet end of the optical fibers and the lowermost inlet end of the optical fibers.

7. An apparatus for detecting the in-focusing conditions as claimed in claim 5, wherein the predetermined focal plane of the optical system may be set at a plane passing through the center inlet end of the center optical fiber and parallel to the plane of the picture elements.

* * * * *